United States Patent

[11] 3,634,664

[72] Inventor Robert J. Valek
Brookfield, Wis.
[21] Appl. No. 813,456
[22] Filed Apr. 4, 1969
[45] Patented Jan. 11, 1972
[73] Assignee The Bendix Corporation

[54] ADAPTIVE AND MANUAL CONTROL SYSTEM FOR MACHINE TOOL
10 Claims, 8 Drawing Figs.

[52] U.S. Cl. .................................................. 235/151.11,
235/150.1, 318/561
[51] Int. Cl. .................................................. G05b 13/02,
G06f 15/46
[50] Field of Search .................................. 235/151.11,
151.1, 150.1; 318/561, 565, 566

[56] References Cited
UNITED STATES PATENTS

| | | | |
|---|---|---|---|
| 3,122,691 | 2/1964 | Centner et al. | 235/151.11 X |
| 3,221,151 | 11/1965 | Cattel et al. | 318/561 |
| 3,248,916 | 5/1966 | Kenyon et al. | 235/151.11 |
| 3,480,765 | 11/1969 | Rouxel et al. | 235/150.1 |
| 3,479,493 | 11/1969 | Jacques et al. | 235/151.1 |
| 3,548,172 | 12/1970 | Centner et al. | 235/151.11 |

FOREIGN PATENTS

| | | | |
|---|---|---|---|
| 372,179 | 11/1963 | Switzerland | 235/151.11 |

*Primary Examiner*—Charles E. Atkinson
*Attorneys*—William F. Thornton and Plante, Hartz, Smith and Thompson

ABSTRACT: A control system for milling machines, and like metal-cutting machines, adapted to control the operation of the milling machines, at the option of an operator, in either a manual or an adaptive control mode. In the manual mode, a manual controller, comprising manually adjustable controls, is set to supply control signals having values determined by the settings to the milling machine drive system. In the adaptive control mode, an adaptive controller automatically generates control signals as a function of physical manifestations which exist at the work area when the milling cutter perform machining operations upon the workpiece. The physical manifestations are sensed and manifestation signals, which are a function of the physical manifestations sensed, are generated and supplied to a computer in the adaptive controller which compares the manifestation signals with constant signals having values establishing desired ranges of machine operation. If the manifestation signals have values which are within the range of values set by the constant signals, control signals are generated to increase machine productivity in accordance with a predetermined strategy. If the values of the manifestation signals are without the range of values set by the constant signals, restricting control signals are generated. The drive system receives the control signals and generates command signals in accordance with the values of the control signals received. The command signals are fed to the machine to regulate the relative rate of movement of the cutter and workpiece.

INVENTOR
ROBERT J. VALEK
By William F. Thornton
ATTORNEY

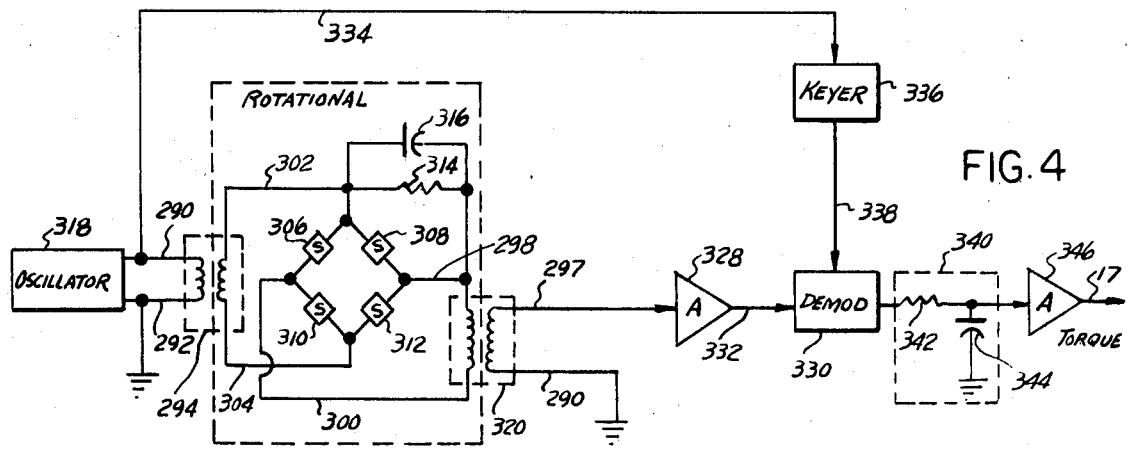
FIG. 4
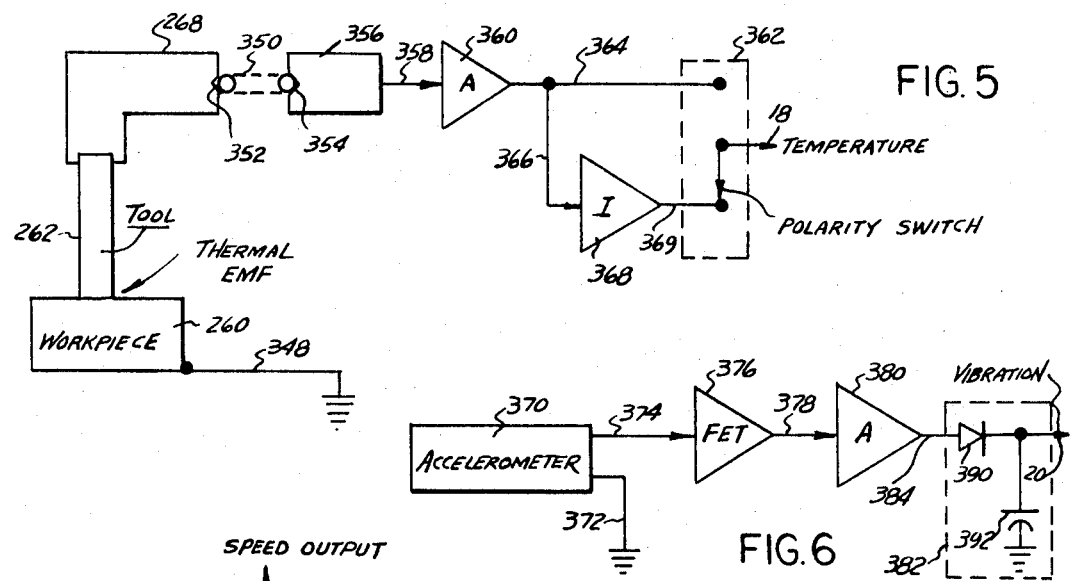
FIG. 5
FIG. 6
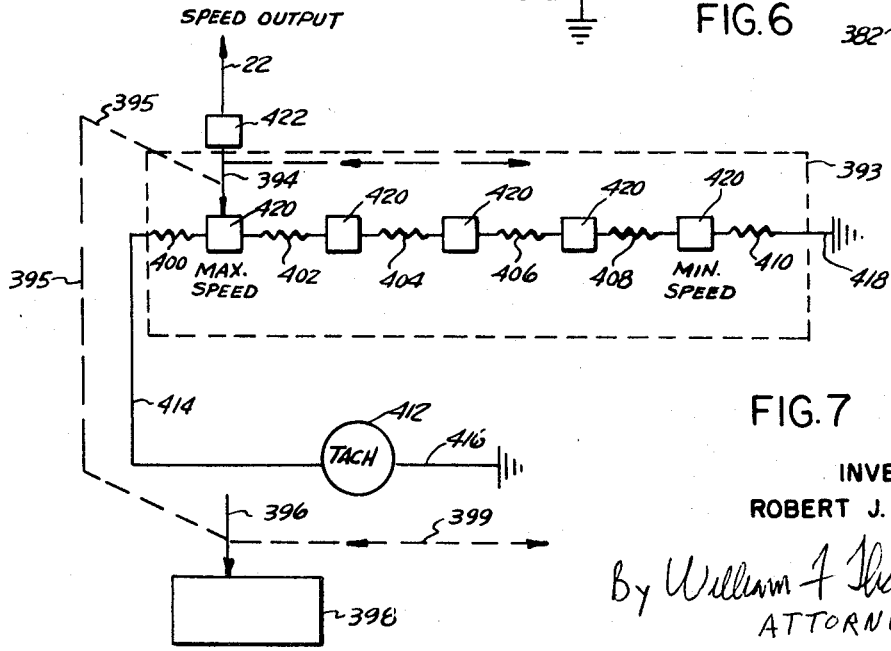
FIG. 7
INVENTOR
ROBERT J. VALEK
By William J. Thornton
ATTORNEY

ADAPTIVE AND MANUAL CONTROL SYSTEM FOR MACHINE TOOL

BACKGROUND OF THE INVENTION

I. Field of the Invention

This invention relates to machine tool control systems and particularly to control systems which include the adaptive control technique of operating a machine as a function of conditions which exist at an interface between the tool of the machine and the workpiece.

II. Description of the Prior Art

The general purpose of the invention is to provide an adaptive control system for use with online production machines which are not numerically controlled. Although numerical control generally eliminates the need for models or templates to perform coordinated motions in the machining of a workpiece, numerical control is not applicable to all machining operations. Economics frequently dictate that numerically controlled machinery not be used to perform machining operations on special metals, limited quantity special orders, and simple straight-pass operations. Nevertheless, all of the economic advantages generally attributable to the use of numerical control need not be totally forsaken where numerical control is inapplicable. Less costly operation is attainable in the above-mentioned special cases when the techniques of adaptive control are properly applied. Adaptive control systems are capable of insuring that a machine is operating at its maximum productivity defined as maintaining the highest possible metal removal rate consistent with manufacturing acceptable parts and experiencing a reasonable tool wear. Therefore, the introduction of an adaptive control system allows certain economic benefits to be realized even without numerical control, since the guesswork inherent in empirical techniques of machine operation is eliminated.

An adaptive control system may also be profitably put to use where experimental machine processes are being carried out. In such operations, the operator is given the flexibility to change the ranges of machine operations and to analyze the resultant products from each various set of parameters imposed during the special machining processes. Information acquired in this manner may be utilized in setting up adaptive control systems for machines with or without numerical control. This information is especially useful for online machinery in mass production industries.

CROSS-REFERENCE TO A RELATED APPLICATION

An adaptive control system which is used in conjunction with numerical control is disclosed in a copending U.S. Pat. application, Ser. No. 391,549, filed Aug. 24, 1964 now U.S. Pat. Ser. No. 3,548,172 issued Dec. 15, 1970 to R. M. Centner et al. That patent, which is owned by the assignee of the present invention, discloses and teaches the use of adaptive control to optimize the operation of machines equipped with numerical control, by continually sampling sensed machining conditions, generating a figure-of-merit as a function of the conditions sensed, and generating control signals to operate the machine as a function of the rate of change of the figure-of-merit.

SUMMARY OF THE INVENTION

The present invention contemplates a manual and an automatic control system for a generally conventional milling machine having a variable-speed cutting tool or cutter spindle drive motor and a table drive motor, but with the added feature of gear trains operatively connected to each motor to provide extended speed control while maintaining satisfactory drive efficiency of the relative movement of the cutter and of the workpiece-supporting table. The machine is normally adapted to move the cutter and the workpiece relative to each other along a plurality of axes.

A drive system is included as a part of the control system to supply command signals sufficient to operate the drive motors of the milling machine and to coordinate the signal amplitude with the respective gear train in use. At all times, either the manual or the automatic control system is operably connected to the milling machine through the drive system. The interconnection is accomplished by a relay. The manual control system includes manually operable controls which are set in order to supply signals of corresponding values to the drive system to operate the machine accordingly.

During the machining operation, material is removed from the workpiece by the cutter and the interaction between the cutter and the workpiece manifests numerous physical conditions. Conditions generated include spindle torsional angular displacement, tool temperature increase above ambient, vibration of the tool, and deflection of the tool. Under the automatic control system, these physical conditions, also referred to as manifestations, are sensed with instruments disposed in proximity to the tool-workpiece interface and the instruments transpose such conditions into representative electrical signals, herein referred to as manifestation signals.

If, at any time, the value of measured conditions exceeds the value limits, i.e., if it is outside the selected value range of machine operation, it violates the constraint. If no violation exists, i.e., if it is within the value range, the adaptive controller generates appropriate signals to maximize the machine productivity and assumes an optimization mode. If a constraint violation exists, the adaptive controller takes corrective action and generates electrical signals for decreasing table feed rate or spindle speed and assumes a constraint mode. The adaptive controller continually compares the manifestations and the constant signals to determine the necessary action to maximize machine productivity without extended violation of the set limitations.

It is therefore apparent that a control system comprising both an automatic and a manual mode of operation provides great flexibility in milling operations and other machining, and that such a system is capable of sensing existing conditions due to uncontrollable variables in the tool and/or the workpiece which otherwise go generally unobserved by the average machine operator, and that such a system is adaptable to interpret the sensed machining conditions so as to optimize productivity in milling machines and the like on a self-monitoring basis.

BRIEF DESCRIPTION OF THE DRAWINGS

FIG. 4 is a schematic electrical diagram of an example of instrumentation for measurement of spindle torque;

FIG. 5 is a schematic electrical diagram of an example of instrumentation for measurement of tool tip temperature;

FIG. 6 is a schematic electrical diagram of an example of instrumentation for measurement of spindle vibration;

FIG. 7 is a schematic electrical diagram of an example of voltage divider for spindle speed and feed rate measurements.

DETAILED DESCRIPTION OF THE PREFERRED EMBODIMENT

Figure 1:
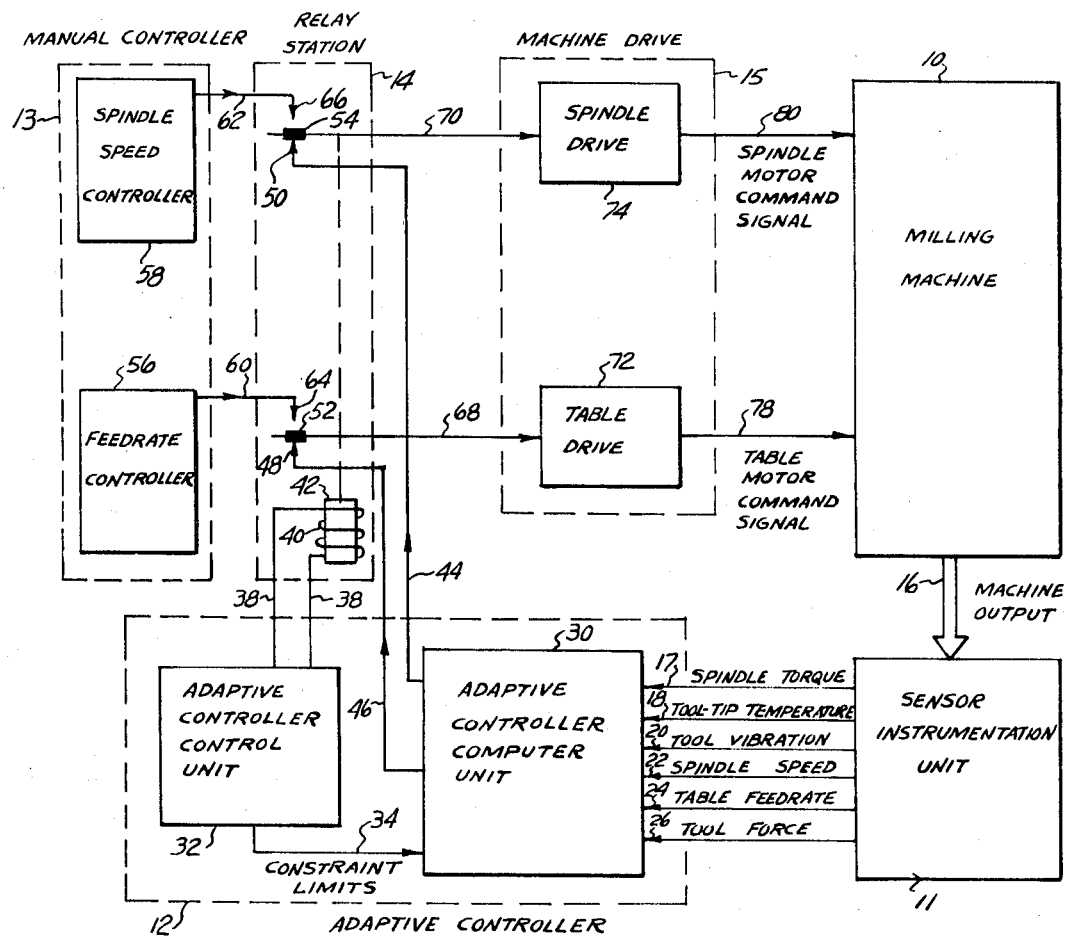
FIG. 1 is a schematic simplified block diagram of an example of a control system for a milling machine operative under manual and adaptive control modes according to the present invention.

An example of an adaptive control system according to the present invention as illustrated in FIG. 1 in a schematic block diagram form. A milling machine 10 operating upon a workpiece, under conditions sensed by a plurality of condition sensors forming a sensor instrumentation unit generally shown at 11, is provided with a machine drive 15 which is controlled by signals, originating either from a manually operated manual controller 13 or from an automatically operated adaptive controller 12 functioning under the influence of signals from the sensors. A relay 14 is operable to switch the machine drive 15 to receive signals from either the manual controller 13 or the adaptive controller 12. The milling machine 10 is substantially conventional and comprises a power-driven spindle mounted in a housing, a cutting tool or cutter supported by the rotating end of the spindle, a table on which is mounted a workpiece, and controllable-speed, constant-torque, direct current motors for varying the rotation velocity of the spindle cutter, and for varying the translation velocity of the cutter and workpiece relative to each other, simultaneously in three orthogonal directions. In order to provide extra sensitive velocity control in all velocity ranges, variable-ratio gearboxes are preferably included as a specific feature of the milling machine 10. The controllable-speed motors are each connected through an appropriate gearbox to the cutter spindle and the table feed mechanisms. Each gearbox contains interchangeable sets of gears of various ratios to accommodate the particular milling machine operation being performed. A simple mechanical gear-changing lever is manipulated to incorporate the gear train desired.

The output of the milling machine 10 is illustrated by flow arrow 16. During a machining operation, the cutter removes material from the workpiece at the cutter-workpiece interface. At the interface, the interaction between the cutter and the workpiece generates several physical manifestations. The manifestations generated include spindle torsional angular displacement, tool tip temperature increase above ambient, vibration and deflection of the cutter. To maximize the productivity of the milling machine 10 on an automatic self-monitoring basis, the adaptive controller 12 is adapted to generate control signals as a function of signals having values representative of the manifestations generated. Accordingly, the sensor instrumentation unit 11 is adapted to sense, to generate and to transmit electrical signals as a function of the manifestations sensed. Individual component instruments included as a part of the sensor instrumentation unit 11 are disposed in proximity to the cutter-workpiece interface and generally are in close contact with the spindle, the cutter, the workpiece, and/or the table. The components of the sensor instrumentation unit 11 are respectively operative to generate a spindle torque signal as a function of the spindle torsional angular displacement, a tool tip temperature signal as a function of the tool tip temperature increase above ambient, a tool vibration signal as a function of the amplitude of the displacement of the spindle housing, and tool force signals as a function of measurements made by a dynamometer or load-sensing device mounted on the table. The sensor instrumentation unit 11, in addition to having the components sensing the physical manifestations generated at the tool-workpiece interface, includes components operative to generate a spindle speed signal as a function of a signal from a tachometer coupled to the spindle and to generate a feed rate signal as a function of a signal from a tachometer coupled to the table motor. These signals, in addition to the manifestation signals, generally provide all-encompassing real-time information regarding the machine operation in progress. The sensor instrumentation unit 11 supplies the electrical signals of spindle torque, tool tip temperature, tool vibration, spindle speed, table feed rate, and tool force directly to the adaptive controller 12 on channels 17, 18, 20, 22 and 26, respectively.

The adaptive controller 12 generally consists of an adaptive controller control unit 32 to establish preset control signals and an adaptive controller computer unit 30. The adaptive controller 12 is adapted to maximize productivity of the milling machine 10 by generating and supplying control signals on lines 44 and 46 as a function of the received signals and in accordance with a plan to maintain the highest possible metal removal rate consistent with acceptable manufactured parts and a reasonable tool life. The adaptive controller 12 operates to maximize productivity by following a planned strategy. The strategy includes having the adaptive controller computer unit 30 function operationally by utilizing internal variables of spindle speed, V (revolutions per minute), and chip load, $f$ (inches of table traverse per revolution of the spindle). The internal variable of chip load is not directly useable by the milling machine 10, since it requires signals of spindle speed and feed rate. Consequently, a conversion is necessary. Feed rate, F (inches per minute), is therefore computed in the adaptive controller computer unit 30 according to the equation: (feed rate) = (chip load) × (spindle speed) and is supplied as an output. Accordingly, the feed rate is always determinable once the chip load and the spindle speed are specified.

The adaptive controller computer unit 30 receives at its input electrical signals representing spindle torque, tool tip temperature, tool vibration, spindle speed, table feed rate, and tool force and compares the values of these signals respectively with preset constant signals having values which determine the desired operational range of the milling machine 10. The preset constant signals, also referred to herein as constraint limit signals, are supplied to the adaptive controller computer unit 30 by the adaptive controller control unit 32 on a channel 34. The adaptive controller control unit 32 includes a control panel which has several manually adjustable controls including potentiometers adapted to transmit on the channel 34 constant constraint limit signals representative of the values manually set on the controls. The constant signals supplied through the channel 34 include maximum spindle torque, minimum spindle torque, maximum tool temperature, maximum table vibration, maximum spindle speed, maximum chip load, maximum feed rate, and maximum tool force. In addition to the constraint limit potentiometer controls, the control panel of the adaptive controller control unit 32 also includes power-switching controls, mode controls to select manual or adaptive control, rate controls to select the rate at which the optimization or the constraint violation changes are to be made, spindle speed and chip load step controls to select the size of the increase or decrease of each change, a select switch for a change in either the spindle speed or the feed rate responding to the constraint violations, an optimization halting device to reset the spindle speed and the feed rate to their initial conditions, and an optimization halting device to stop the optimization, but to maintain the existing levels of the spindle speed and the feed rate.

The controls to select the rate at which the optimization or the constraint violation changes are to be made and to select the size of the increase or decrease of each of the spindle speed and the chip load changes, are incremented in step sizes which are selectable and somewhat arbitrary, but which are selected to provide for continuous machine operation and machined parts having acceptable finishes. The spindle speed and the chip load step rate controls are continuously adjustable from 0.01 to 1.0 second per change. The controls which determine the step size of each of the spindle speed and the chip load change have four adjustable positions.

These four positions correspond respectively to 0.2 percent, 0.4 percent, and 0.8 percent and 1.6 percent of maximum spindle speed for the selected gear range and 0.8 percent, 1.6 percent, 3.2 percent, and 6.4 percent of maximum chip load likewise for the selected gear range. Since the feed rate is the product of the chip load and the spindle speed, respective changes in the feed rate are arrived at as a function of both of the variables. For example, if the spindle speed motor is at 50 percent of its maximum speed, a step of 0.8 percent in the chip load causes a change of only 0.4 percent in the feed rate.

The adaptive controller computer unit 30 is adapted to promote optimization of the productivity of the milling machine 10 under a constraint violation type of operation. The adaptive controller computer unit 30 receives the sensed signals from the sensor instrumentation unit 11 and the constraint limit values from the adaptive controller control unit 32, and compares the received signals to determine whether or not the values of the sensed signals are within the ranges of machine operation set by the values of the constraint limit signals. If at any time a sensed signal value is outside the range of operation set by the constraint limit values, a violation of the constraint limit signal has occurred and the adaptive controller computer unit 30 decreases the speed of operation of the milling machine 10. If no violation exists, i.e., if the value of the sensed signal is within the constraint limit range of values, the adaptive controller computer unit 30 optimizes the operation of the milling machine 10 by increasing the speed of machine operation.

Thus, it can be seen that the primary operational functions to implement the optimization or the constraint modes of operation of the adaptive controller 12 are carried out by the adaptive controller computer unit 30. In order to fulfill its function, the adaptive controller computer unit 30 comprises comparator, logic, register, and output sections, which are more fully described hereinafter. Briefly stated, individual comparators in the comparator section of the adaptive controller computer unit 30 respectively accept the sensed signals transmitted from the sensor instrumentation unit 11 and the corresponding maximum and minimum constraint limit signals transmitted on the channel 34 from the adaptive controller control unit 32. The differential magnitude between the respective signals is registered in each of the individual comparators. A digital pulse representative of the comparison is transmitted to the logic section which reads the comparisons at regular time intervals and makes the primary determination to operate the adaptive controller 12 in the optimization or the constraint mode. Once that selection is made, the logic section generates signals to change the spindle speed or the chip load. The signals are transmitted to registers in the register section to accomplish, in cooperation with counters, a gradual stepping of the signals. The stepped signals are transmitted to the output section of the adaptive controller computer unit 30 which converts the signals to voltages of a sufficient magnitude to be accepted and responded to by the machine drive 15 controlling the spindle and table motors of the milling machine 10.

The adaptive controller control unit 32, as mentioned hereinbefore, includes the mode controls to switch the control of the milling machine 10 between the manual and the adaptive control modes, and controls to initiate optimization when in the adaptive control mode. This is accomplished by relay 14, FIG. 1, which, when activated by the mode controls on the control panel of the adaptive controller control unit 32, operates the switching of the connection between the machine drive 15 and either the manual controller 13 or the adaptive controller 12. The relay 14 is shown in an energized adaptive control state wherein a relay coil 40, wound about a relay core 42, has current supplied to it through transmission lines 38 from the adaptive controller control unit 32. The energized core 42 magnetically attracts movable relay contacts 52 and 54 and holds them in contact with stationary relay contacts 48 and 50, respectively. When in contact as shown, the electrical control signal for the table motor generated in the adaptive controller computer unit 30, passes through a line 46, the stationary contact 48, the movable contact 52 and a line 68 to the machine drive 15. Similarly, the electrical control signal for the spindle motor generated in the adaptive controller computer unit 30, passes through a line 44, the stationary contact 50, the movable contact 54 and a line 70 to the machine drive 15.

At such times as the relay core 42 is not energized, the movable relay contacts 52 and 54 make contact with stationary relay contacts 64 and 66, respectively, and establish a manual control mode. In the manual control mode, the machine drive 15 is connected to receive table motor control signals from the manual controller 13 through a line 60 connected to the stationary contact 64 which, in such mode, is in contact with the movable contact 52 connected to the line 68. Likewise, the machine drive 15 is connected to receive spindle motor control signals from the manual controller 13 through a line 62 connected to the stationary relay contact 66, which is in contact with the movable contact 54 connected to the line 70.

As substantially shown in FIG. 1, the manual controller 13 includes two sections, a feed rate controller 56 and a spindle speed controller 58, for respectively generating the table motor control signals and the spindle motor control signals which are respectively transmitted on the lines 60 and 62 through the relay 14 to the machine drive 15, as hereinabove mentioned. The signals transmitted are representative of values manually set on adjustable potentiometers included as a part of the feed rate controller 56 and the spindle speed controller 58.

Consequently, the machine drive 15 is controllable by either the manual controller 13 or the adaptive controller 12 and is connectable to either one by the relay 14. As illustrated in FIG. 1, the machine drive 15 includes a table drive 72 and a spindle drive 74. As hereinabove explained, the transmitted control signals from either the manual controller 13 or the adaptive controller 12 are received into the machine drive 15 on lines 68 and 70 and are respectively accepted by the table drive 72 and the spindle drive 74. The table drive 72 and the spindle drive 74 responding to the control signals received in the lines 68 and 70 supply appropriate signals to the milling machine 10 to power the table and the spindle motors, on command signal powerlines 78 and 80, respectively.

The control signals, which are transmitted on the lines 44 and 46 or 60 and 62 to the machine drive 15, are generated as a function of the armature current of the spindle and the table motors and are percentages of the selected gear range of the milling machine 10. For example, a 50 percent spindle speed control signal indicates a speed of one-half the maximum for the selected gear range. If the operator desires to operate the spindle at a maximum of 500 revolutions per minute, he sets the spindle speed constraint limit at 500 revolutions per minute. If the machine is selected to operate in the 1,000 revolutions per minute gear range, the adaptive controller 12 responds with a control signal of 50 percent for maximum spindle speed. If the operator changes the gear range of the milling machine 10 to 600 revolutions per minute, the adaptive controller 12 changes the control signal to 83 percent for maximum spindle speed. The machine drive system 15 is adapted to process the percent control signals transmitted from either the adaptive controller 12 or the manual controller 13 and to correspondingly generate the command signals, which are of considerably greater magnitude than the control signals, in order to operate the spindle and the table motors of the milling machine 10. The operation of the machine drive 15 utilized in the preferred embodiment is described in detail in Reliance Electric Instruction Book No. 83,498.

As mentioned hereinbefore, the adaptive controller 12 of the present invention is adapted either to optimize or to correct constraint violations. In the absence of any constraint violation signals, the adaptive controller 12 operates to optimize the machine productivity. In the presence of a constraint violation of a constraint violation signal, the optimization is suspended and the corrective action is initiated to eliminate the constraint violation.

In the adaptive controller 12, a strategy of increasing the metal removal rate when no constraint violations are present is employed. This strategy is suitable for most milling machine operations where the tool cost is low compared to the labor and the machine overhead cost. When it is necessary to correct the constraint violations, there are four possible outputs which serve to either increase or decrease the chip load or spindle speed. The following table lists the correction rules used:

| Constraint violation | Correction Command | Effects |
| --- | --- | --- |
| Maximum spindle torque | Decrease $f$ | Limits cutting forces thereby minimizing tool deflection and breakage. |
| Maximum tool tip temperature. | Decrease $V$ | Prevents excessive tool wear rate and surface burning on workpiece. |
| Maximum tool vibration | Decrease $f$ | Prevents tool chatter and poor finish on workpiece. |
| Maximum spindle speed | Decrease $V$ | Prevents excessive tool wear rate and surface burning on workpiece: protects spindle motor. |
| Maximum chip load | Decrease $f$ | Prevents tool deflection and breakage. |
| Maximum table feedrate | Selectable | Protects table motor. |
| Minimum spindle speed | Increase $V$ | Prevents poor finish: protects spindle motor. |
| Minimum chip load | Increase $f$ | Guarantees minimum metal removal rate. |
| Minimum table feedrate | Increase $f$, increase $V$. | Guarantees minimum metal removal rate: protects table motor. |
| Minimum spindle torque | None | Detects interrupted cut. |

For example, a maximum spindle torque constraint violation will cause a decrease $f$ command to be generated. Thus, in either the optimization or the constraint mode the adaptive controller 12 is regularly generating increment or decrement signals.

In the above table, the maximum table feed rate, which is proportional to the metal removal rate, is included as a constraint to protect the table drive 72 and the table motor of the milling machine 10. Violation of this constraint indicates that the machine tool is at the maximum metal removal rate possible for the machining operation. In this situation, it does not matter whether the chip load or the spindle speed correction is given, since the feed rate is the multiplication product of the chip load times the spindle speed. The choice between the two will possible effect the surface finish of the workpiece, but it is left as a selectable operator's decision.

A desirable feature for any intermittent cutting is that the adaptive controller 12 be able to determine when the milling machine is actually cutting metal. During a heavy cut, the feed rate may be held to a low value due to a high spindle torque. When the cut is interrupted, the maximum spindle speed torque constraint is no longer effective and the feed rate is likely to increase to its maximum. Under these conditions, the cutter reenters the workpiece at the maximum feed rate and the cutter may be broken. To avoid this, a minimum spindle torque constraint is supplied that simply inhibits any changes in the spindle speed or the chip load. Any violation of this constraint halts optimization but does not generate a correction signal. The strategy here is for the cutter to safely reenter the workpiece at the feed rate at which it left the workpiece. In the above table, where a selectable corrective action is included, the operator selects the action through the select switches on the control panel of the adaptive controller control unit 32.

Figure 2:
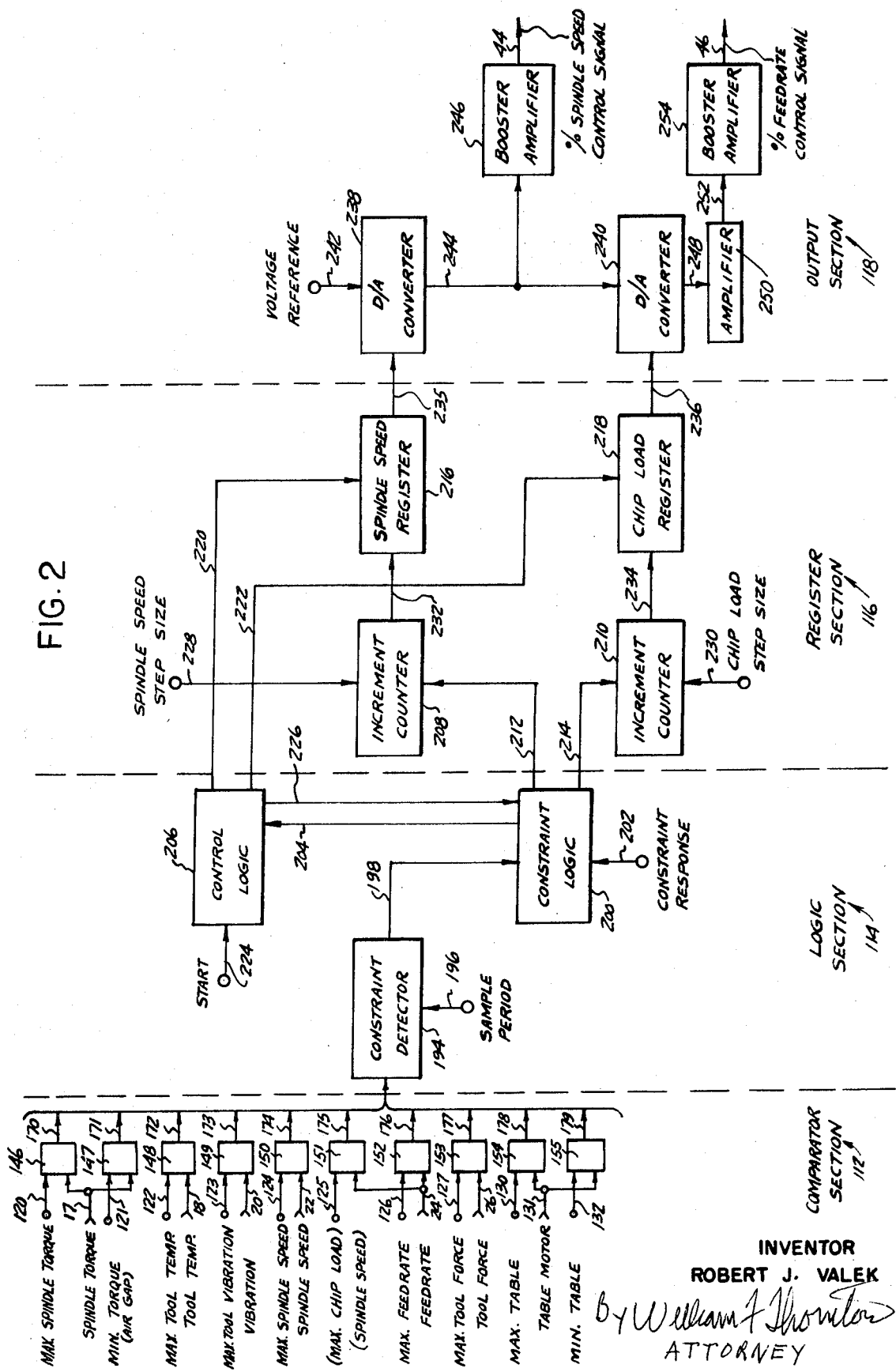
FIG. 2 is a detailed block diagram of the adaptive controller system portion forming part of the control system illustrated in FIG. 1.

The adaptive controller 12, schematically illustrated in FIG. 2 in a detailed block diagram, includes a comparator section 112 which accepts at its input the sensed signals from the sensor instrumentation unit 11, FIG. 1, and the preset constant signals from the adaptive controller control unit 32 and supplies at its output a digital signal signifying that the sensed signals are within or without the set operating limits. Similarly illustrated are a logic section 114 to initiate in digital form, after an analysis of the results obtained in the comparator section 112, the respective signal change determined to be scheduled, a register section 116 to size and pace the signal changes scheduled, and an output section 118 to change the digital signals to scaled analog signals for acceptance by both the spindle and the table drive units.

The comparator section 112 comprises a plurality of comparators 146–155, to which are applied the outputs from the sensor instrumentation unit 11. Sensor instrumentation signals transmitted on the channels 17, 18, 20, 22, 24 and 26 of FIG. 1 are applied to the comparators 146 and 147, 148, 149, 150, 151, 152 and 153 of FIG. 2, respectively. The comparators 146–153 also respectively receive the constraint or limit signals on the transmission channel 34 comprising input lines 120–127 from the adjustment potentiometers of the control panel in the adaptive controller control unit 32. The comparators 154 and 155 receive the maximum and minimum table motor speed limits on lines 130 and 132 from separate controls having fixed settings. Input line 131 to both the comparators 154 and 155 transmits a table motor speed signal from the sensor instrumentation unit 11. The chip load comparator 151 has two unique inputs since the system has no analog voltage of the chip load. One input is the analog voltage of feed rate received on the line 24 and the other is the analog voltage product of a spindle speed multiplied by the maximum chip load constraint limit received on the line 125 from the adaptive controller control unit 32. In other words, the circuit of the chip load comparator 151 compares (chip load, max.) × (spindle speed) to (feed rate). Since (feed rate) = (chip load) × (spindle speed), the circuit in the comparator 151 thus compares (chip load, max.) × (spindle speed), to (ship load) × (spindle speed), with the (spindle speed) cancelling out of the comparison with the result that the circuit compares (chip load, max.) to (chip load).

Each of the comparators 146–155 is a combination analog adder-digital converter. The input to each of the comparators is a set of analog voltages of opposite polarity. The strength and the polarity of the added signals is determinative of the logic state assumed. All of the comparators 146–155 operate similarly as each compares the received analog-sensed signal to the constraint signal and each generates a digital pulse indicative of that comparison. Each comparator, operating as a differential amplifier, generates a logic ONE if the magnitude of the sensed signal is greater than the magnitude of the constraint limit signal, and a logic ZERO otherwise. It will be appreciated that where a given sensed signal is supplied to a set of two comparators, respectively comparing the maximum and minimum constraint limits, a logic inverter is necessarily included in one of the set of two in order to have an output consistent with the arbitrarily selected digital coding system. Accordingly, a logic inverter (not shown) is included in either one of the two comparators in the sets 146 and 147, 151 and 152, 154 and 155.

A constraint detector 194, disposed in the logic section 114, receives the output digital signals from the comparators 146–155 on output channels 170–179, respectively. At regular intervals, determined by the sample period adjustment signals supply on channel 196 from the adaptive controller control unit 32, the constraint detector 194 examines the output from the comparators. At the beginning of the sample period, a sampling signal interrogates the comparators 146–155 and transfers the comparator outputs on the channels 170–179 to a bank of flip-flops included in the constraint detector 194. The data on these flip-flops is saved until the start of the next sample period.

The output of the flip-flops in the constraint detector 194 is supplied on a channel 198 to a constraint logic 200. The constraint logic 200 included in the logic section 114 implements the correction actions listed in the table above. The constraint logic 200 determines whether a constraint violation requires a chip load or spindle speed correction response or whether optimization can be permitted. The construction of such logic is well known in the art.

Constraint response selection signals from the adaptive controller control unit 32 are supplied to the constraint logic 200 on a channel 202. Output signals from the constraint logic 200 are transferred on a line 204 to a control logic 206. At the same time, output signals from the constraint logic 200 are transferred to increment counters 208 and 210 in the register section 116 on channels 212 and 214, respectively. The control logic 206 generates four major signals; increase spindle speed, decrease spindle speed, increase ship load and decrease chip load. These four signals are routed to a percent spindle speed register 216 and a percent chip load register 218 on channels 220 and 222, respectively. The control logic 206 and the constraint logic 200 comprises logic circuitry well known in the art including sets of logic gates connected in a cascade fashion. The control logic 206 is also adapted to generate a start increment signal in response to a start command transmitted on a line 224 from the adaptive controller control unit 32 and transfers the start increment signal on a channel 226 to the constraint logic 200 to be fed therefrom on the channels 212 and 214 to the increment counters 208 and 210, respectively.

The register section 116 consists of the two increment counters 208 and 210 and the two percent registers 216 and 218. The two percent registers 216 and 218 are nine-bit binary up-down counters which store the percent chip load and the percent spindle speed values in digital form. The percent spindle speed and percent chip load (and thereby percent feed rate) are changed by permitting the registers 216 and 218 to count up or down a number of counts. The signals for step-size adjustments from the adaptive controller control unit 32 are fed on channels 228 and 230 to the increment counters 208 and 210, respectively, and they determine the number of counts per the sample period signal supplied on the channel 196. For example, when the spindle speed step-size control is in position 1, only one count per sample period is permitted. One count in a nine-bit register is worth one part in 512, or about 0.2 percent. Positions 2, 3 and 4 permit two, four and eight counts, respectively. Similarly, the chip load step-size control permits one, two, four or eight counts to be added to (or subtracted from) the value in the percent chip load register 218. For reasons explained later, the percent chip load register 218 is arbitrarily divided into a seven-bit register with two "over bits." Thus, a count of one is worth 0.8 percent. The increment counters 208 and 210 are comprised of a bank of flip-flops interconnected with gates. The counters perform the actual metering and are up-counters only, and they smooth out the corrective actions of the constraint logic 200 and the control logic 206 in the following manner.

The increment counters 208 and 210 act on the signals supplied from the step-size controls on the channels 228 and 230 and perform the actual metering of the counts into the spindle speed register 216 and the chip load register 218, respectively. The increment counters 208 and 210 are each four-bit binary counters that count in synchronization with their associated register. Each increment counter contains a set of decoders, one of which indicates the count held by the increment counter. Activation of a particular decoder is determined by the step-size adjustment selected. For example, if the spindle speed step-size signal control is in the third position, four counts are permitted.

At the beginning of the sample period, the percent spindle speed register 216 contains some percent spindle speed value in digital (binary) form, and the percent spindle speed increment counter 208 is at zero. A clock signal from the constraint logic 200 in the logic section 114 is transmitted on the channel 212 and starts the spindle speed register 216 and the increment counter 208 counting in synchronization. They continue to count until the increment counter 208 contains a count of four. At that time, the appropriate decoder, enabled by the third-position spindle speed step-size signal transmitted on the channel 228 from the control on the control panel of adaptive controller control unit 32 to the increment counter 208, generates a signal indicating that the spindle speed has been incremented by a predetermined step size. This signal removes the clock signal received from the constraint logic 200 and prevents any further counts from being applied to the percent spindle speed register 216. The increment counter 208 resets to ZERO and no further change can be made to the percent spindle speed until the next sample period. The synchronized incremental counting is controlled by signal transmission through lines 232 and 234 from the increment counter 208 to the percent spindle speed register 216 and from the increment counter 210 to the percent chip load register 218, respectively.

The counters in the register section 116 count at a rate of about 330 kHz., which is much faster than the cycling of the sample period. This rate is also far beyond the response of the milling machine 10. Thus, although the percent spindle speed register 216 is incremented in a burst of small steps, the output change in the spindle speed appears as a smooth transition. The counters and the registers included in the register section 116 are of the types well known in the art.

The output section 118 of the adaptive controller 12 receives through transmission lines 235 and 236 the digital signals stored in the percent spindle speed register 216 and the percent chip load register 218. The output section 118 performs three functions on these signals; conversion from digital to analog, computation of feed rate, and scaling. Two digital-to-analog (D/A) converters 238 and 240, respectively, accept the digital signals transmitted on the lines 235 and 236. The converters 238 and 240 are sets of analog switches which are driven by the digital signals and are connected to a resistance ladder. Each switch connects a reference voltage through a portion of the ladder of the output. For example, the most significant bit of the percent spindle speed register 216 switches 50 percent of the reference voltage to the output (a full register is worth 100 percent).

For the spindle speed conversion, a regulated signal is used as a reference and is supplied to the converter 238 on a line 242 from one side of a direct current voltage source (not shown). The other side of the voltage source is grounded. The output of the converter 238 is supplied on a channel 244 to a booster amplifier 246 which generates the voltage range required by the spindle drive 74 (FIG. 1).

In general the output of the D/A converter is a product of an analog reference signal and the digital gating signal. The circuit is thus sometimes referred to as a hybrid multiplier. In the D/A converter 240, the digital input signal supplied on the line 236 from the chip load register 218, constitutes the digital gating signal and the analog signal utilized is the percent spindle speed analog voltage signal generated in the D/A converter 238 and supplied on the channel 244 to both the D/A converter 240 and the booster amplifier 246. The output of the converter 240 is thus the product of (percent chip load) × (percent spindle speed) which equals (percent feed rate). The output voltage from the D/A converter 240 is supplied on a channel 248 to a "times four" amplifier 250. This amplifier allows a full-scale percent feed rate output to be obtained and supplies it on a channel 252 to a booster amplifier 254 even if the percent spindle speed voltage is only a fraction of the total percent. Without the amplifier 250, a reduced percent spindle speed would limit the maximum percent feed rate to the same reduced percent. The output of the amplifier 250 is transmitted to the booster amplifier 254 to generate the voltage level required by the table drive 72, (FIG. 1).

The "times four" amplifier 250 has the effect of increasing the worth of the bits of the percent chip load register 218 by a factor of four also. Thus, the most significant bit is worth, in effect, 200 percent instead of a customary 50 percent. In this manner, the percent chip load register 218 actually consists of only seven bits with two over bits. Thus, a count of one is worth 0.08 percent chip load as opposed to 0.2 percent for the spindle speed. The effective percent feed rate step size is a function of the chip load step-size signal furnished on the channel 230 to the increment counter 210 and also a function of the value of the percent spindle speed. For example, if the spindle speed is 100 percent, a count of one in the percent chip load register 218 is worth 0.08 percent of the feed rate; if the percent spindle speed is 25 percent, however, the same count is worth only 0.02 percent.

The percent spindle speed signals and the percent feed rate control signals leave the output section 118 of the adaptive controller computer unit 30 on the lines 44 and 46, respectively. These lines, as previously mentioned and as shown in FIG. 1, are connected through the relay station 14 to the machine spindle drive 74 and the machine table drive 72, respectively.

The sensor instrumentation unit, generally designated at 11 in FIG. 1, is more fully described in structure and operation relatively to FIGS. 4, 5, 6, 7 and 8. FIG. 4 is a partial schematic section, illustrating a milling machine housing 266 having a spindle 268, supporting a cutting tool 262 for removing material from a workpiece 260 mounted on a table 264. The spindle 268 is electrically insulated from the housing 266 by insulators 270 and is adapted to hold the cutting tool mounted at the lower end thereof. The spindle 268 is rotatably driven by a drive shaft 280 provided with a right-angle drive including a driving gear 279 meshing with a driven gear 278 which is keyed to the spindle 268. A dynamometer (not shown) attached to the table 264 measures the tool forces acting on the cutting tool 262. The dynamometer is generally constructed as a load cell type of weighing platform, and is arranged to give force readings for three orthogonal axes. The dynamometer supplies output signals on channels 272, 274 and 276, each of which represents a force at right angles to the other two. The signals on the lines 272, 274 and 276 are transmitted through the channel 26 from tee sensor instrumentation unit 11 to the adaptive control computer unit 30 (FIG. 1). The dynamometer utilized in the preferred embodiment is of a type well known in the art and is available from LeBow Associates.

Figure 3:
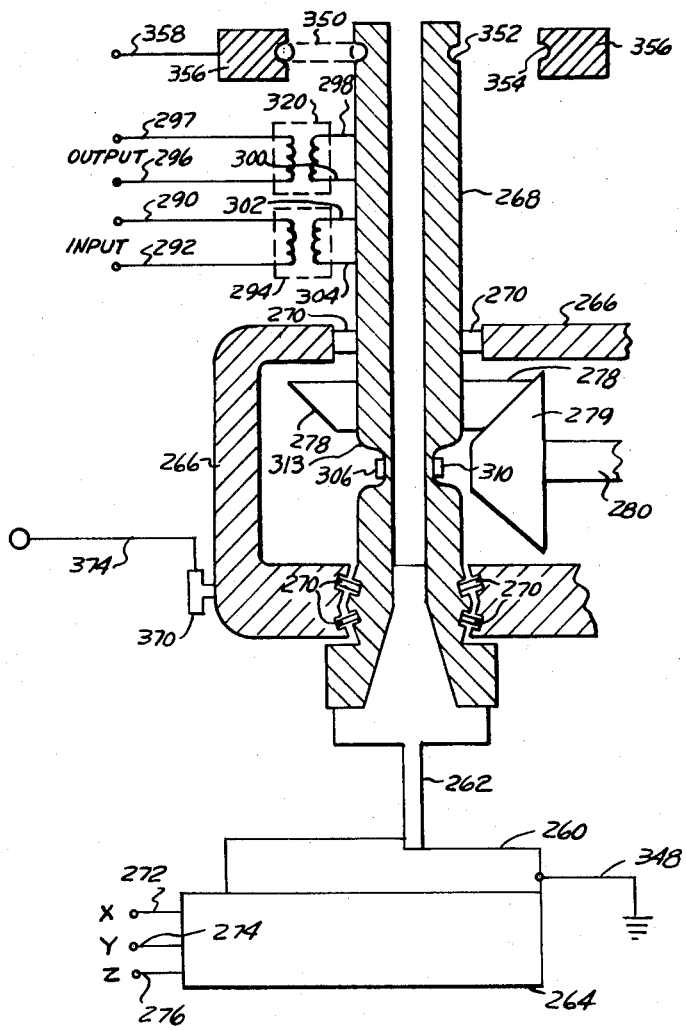
FIG. 3 is a fragmentary schematic illustration of a milling machine spindle, spindle housing, cutting tool, workpiece and table, showing some of the sensor instrumentation forming part of the present invention.

The instrumentation for sensing the torque and for transmitting signals as a function of the torque sensed is particularly illustrated in FIG. 3 and more fully illustrated in FIG. 4. Four strain gages 306, 308, 310 and 312, only strain gages 306 and 310 being shown in FIG. 3, are cemented to the spindle 268 at a reduced-diameter stress concentration portion 313, the strain gages being disposed in two "V" patterns and being electrically connected so as to form a bridge circuit. The strain gages used are small resistive elements whose resistance increases with elongation. Placing the gages at 45° to the axis of the spindle 268 enables the gages to produce a voltage proportional to the spindle torque. Slight differences in the strain gages may cause an output to occur at zero torque. This can be eliminated by adding balancing elements, for example, a resistor 314 and a capacitor 316, disposed in a parallel electrical circuit with the strain gage 208 (FIG. 4). If necessary, further zero calibration is obtained by placing other balancing elements in parallel electrical circuit with the other strain gages. Electrical power to operate the bridge circuit is supplied from a 10-kHz. oscillator 318 on lines 290 and 292. A rotary transformer 294 is utilized to transfer the 10-kHz. electrical power from lines 290–292 to the rotatable bridge circuit, the primary of the rotary transformer 294 defining the stator and the secondary defining the rotor. The rotary transformer primary circuit inductively couples the secondary circuit to energize the bridge circuit through lines 302 and 304 connected across one diagonal of the bridge circuit. As the spindle 268 rotates to drive the cutting tool 262 in engagement with the workpiece 262 and the torque developed by the drive opposed by the cutting forces causes the strain gages 306, 308, 310 and 312 to elongate unequally. The bridge circuit thus becomes unbalanced, and output signals are produced on lines 298 and 300 placing the other diagonal of the bridge circuit across a primary of a second rotary transformer 320. The signals appearing across the secondary of the rotary transformer transmitted on a line 297 to a three-stage RC amplifier 328 for the purpose of increasing the signal strength, the other end of the secondary winding of the rotary transformer 320 being grounded through a line 296. The alternating current signals appearing across the secondary winding of the rotary transformer 320 are generally small due to the small percentage changes in resistance that a strain gage normally exhibits under strain, therefore, a substantially small signal is applied to the amplifier 328.

The strain gage bridge circuit illustrated is in effect an amplitude-modulated suppressed carrier system. At zero torque, no output signal appears across the bridge circuit diagonal connected to lines 298 aND 300. At positive torque, an output signal appears which is in phase with the oscillator signal from the oscillator 318. At negative torque, the output signal is 180° out of phase with the oscillator signal from the oscillator 318. For either torque polarity, the amplitude of the output signal is proportional to the spindle torque. The rotary transformers used in the preferred embodiment are of a type well known in the art and are available from S. Himmelstein and Company.

The gain of the amplifier 328 is approximately 80,000 at 10 kHz. and drops off at other frequencies. The amplified alternating current torque signal, at the output of the amplifier 328, is transmitted to a phase-sensitive demodulator 330 on a line 332. The demodulator 330 is keyed by a keyer 336 on a channel 338. The keying function is controlled by the oscillator 318 connected to the keyer 336 by the line 290 and a line 334. The demodulator 330 "gates" the positive portions of in-phase signals or the negative portions of out-of-phase signals from the bridge circuit. The phase-sensitive demodulator 330 transmits an output through a low-pass filter circuit 340 formed by a series resistor 342 and a grounded capacitor 344. The filtered output is applied to a times-10 direct-coupled amplifier 346 and the amplifier 346 provides an output on the channel 17 which is a direct current analog of the spindle torque.

The structure and circuitry for measurement of the tool tip temperature is partially shown in FIG. 3 and more fully illustrated in FIG. 5. Since the tool 262 and the workpiece 260 are dissimilar metals, they form a natural thermocouple at the point of contact, the tool-workpiece interface. The heat of metal removal induces at the interface a thermal voltage which can be measured. As shown in FIGS. 3 and 5, the workpiece 260 is electrically grounded through a line 348 and the thermal voltage above ground appearing at the interface also appears between ground and the metallic spindle 268. This voltage is applied through a garter spring 350 to a line 358. The garter spring 350 is a toroidal-shaped spring which rotates and revolves in a circular fashion between an inner race 352 in the spindle 268 and a stationary outer race 354 in a contactor 356. The thermal voltage, which is a function of the heat produced during the cutting, is thus transmitted from the cutting tool 262, through the spindle 268 which is electrically insulated from the housing 266 by the insulators 270, through the garter spring 350, to the contactor 356 and via line 358 to an amplifier 360. Since strength of the signal depends greatly on the material differences between the tool 262 and the workpiece 260, either the gain of the amplifier 360 is set to compensate the amplification accordingly, or the constant or constraint limit signal value is manually set to provide the proper scaling, the latter being more desirable. The amplifier 360 has a gain of up to 10,000 and it transmits the amplified signal to one side of a double-pole polarity switch 362 on a line 364. The amplified signal is also transmitted on a line 366 to a unity gain inverter 368. The inverter 368 is connected to the other side of the polarity switch 362 by a line 369. Depending upon the material of the tool 262 and the workpiece 260, the thermal voltage may be positive or negative. The inverter 368 and the polarity switch 362 allows for this possibility and transmits a direct current analog of temperature therefrom on the channel 18.

The vibration measurement circuitry, partially shown in FIG. 3, is fully illustrated in FIG. 6. A crystal accelerometer 370, one side of which is grounded by means of a line 372, is mounted on the spindle housing 266 and generates an alternating voltage as a function of the sinusoidal vibrations of the housing 266. The amplitude of the voltage is directly related to the amplitude of the displacement of the spindle housing 266 and is thus representative of the vibration of the spindle 268. The accelerometer 370 is sensitive enough to pick up normal vibrations generated in the spindle bearings under no-load conditions. Greater vibrations due to tool chatter under load condition are consequently readily sensed. The output voltage is supplied on a channel 374 to a field-effect transistor amplifier 376 which has a high input impedance as required by the accelerometer 370. The amplifier 376 has a gain of one-half. The output of the amplifier 376 is applied on a channel 378 to a direct-coupled amplifier 380 and then from the output of the amplifier 380 on a line 384 to a peak detector 382. The peak detector 382 comprises forwardly disposed series diode 390 and a capacitor 392 connected between the cathode of the diode 390 and ground. The output of the peak detector is thus a direct current analog voltage of the spindle vibration which is transmitted on the line 20 from the sensor instrumentation unit 11 to the adaptive controller computer unit 30.

In addition to input signals representative to the sensed actual conditions existing at the tool-workpiece interface, the adaptive controller 12 is also supplied signals representative of the absolute spindle speed in revolutions per minute and feed rate in inches per minute.

FIG. 7 illustrates a voltage divider for the absolute spindle speed measurement.

The spindle of the milling machine 10 is driven through a variable-ratio gearbox, schematically shown at 398 in FIG. 7. The gear ratio of the gearbox may be manually operated by way of a gear-shifting lever or the like arbitrarily shown at 396. A rotary or slide switch, generally illustrated in FIG. 7 as a slide switch 393, has a slider 394 which is connected through appropriate mechanical linkages 395 to the gear-shifting lever 396. The directions of movement of slider 394 and gear-shifting lever 396 are arbitrarily indicated by directional arrows 399. The switch 392 is provided with a chain of resistors 400, 402, 404, 406, 408 and 410, which are connected serially by contactors 420 disposed between two consecutive resistors. Although six resistors 400-410 are shown, it is obvious more or fewer resistors may be used accordingly to the number of gear ratios provided by the gearbox. The chain of resistors forms a voltage divider for the output of a tachometer 412. The output of the tachometer 412 is applied to the string of resistors in the slide switch 393 by a line 414, the electrical circuit being completed by means of ground lines 416 and 418 respectively. As the gear-shifting lever 396 is displaced, the linkages 395 displaces the slider 394 to an appropriate position at one of the several contactors 420. The value of each of the series-connected resistors 400-410 is proportional to the corresponding difference in speed between the adjacent gears ratios of the gearbox 398. It can thus be seen that the voltage appearing at the slider 394 is proportional to the absolute spindle speed in revolutions per minute. The absolute spindle speed signal is transmitted from the slider 394 to contactor 422. The slider 394 and the contactor 422 maintain continuous contact as the slider 394 is disposed along the string of resistors 400-410. The signal travels through the contactor 422 via the output line 221 to the adaptive controller computer unit 30 of FIG. 1. Similar circuits are utilized for obtaining from the table drive motor tachometer measurements of absolute feed rate, which are supplied from the sensor instrumentation unit 11 on the line 24 to the adaptive controller computer unit 30.

Figure 8:
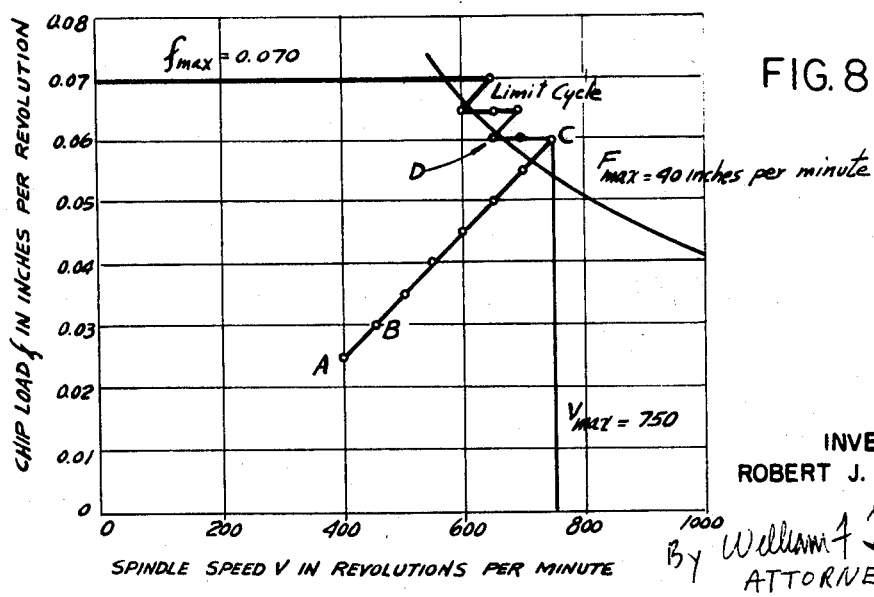
FIG. 8 is a graph illustrating in a simplified manner productivity maximization with arbitrary constraint limits on the chip load, the spindle feed and the feed rate.

The operation of the example of adaptive and manual control system for a milling machine and the like hereinbefore described is graphically illustrated in a simplified manner in the graph of FIG. 8.

The graph of FIG. 8 displays hypothetical constraint limits of chip load, $f$, as 0.070 inches per revolution and spindle speed, $V$, as 750 revolutions per minute and maximum feed rate, $F$, as 40 inches per minute. For this illustration, the assumed corrections are a decrease in the spindle speed for a maximum spindle speed constraint violation or a maximum feed rate constraint violation, and a decrease in the chip load for a maximum chip load constraint violation. The initial operating point in FIG. 8 is at "A." At point "A" no constraint violation exists and the adaptive controller 12 automatically places itself in the optimization mode. It then increases the chip load and the spindle speed to a point "B." The increases in the chip load and the spindle speed between the points "A" and "B" are defined as the step sizes for the chip load and the spindle speed, respectively. Since no constraints are violated at the point "B," the adaptive controller 12 stays in the optimization mode and again increases the chip load and the spindle speed by one step size each. This sequence of operation continues as illustrated until the operating point shifts to point "C."

At the point "C," the adaptive control 12 detects a maximum feed rate constraint violation, automatically places itself in the constraint mode, and corrects the constraint violation by decreasing the spindle speed until the operating point moved to point "D." At the point "D," no constraint violations are present and the optimization resumes. The adaptive control 12 ultimately places the operating point in the limit cycle as illustrated. FIG. 8 illustrates the operation of the adaptive controller 12 in the presence of three hypothetical constraining limits, which are particularly useful for illustration purposes. Of prime concern, however, are the constraint limits on such measurable parameters as the spindle torque, the tool deflection, the tool tip temperature, the spindle vibration, because they characterize the output of the milling machine 10 and supply information about the tool and the workpiece conditions. Thus, the adaptive control 12 generally operates in the limit cycle formed by the constraint limits on the measurable parameters. The constraint limits on the feed rate, the chip load and the spindle speed perform primarily a safety function.

While an example of a preferred embodiment has been shown and described, various modifications and substitutions may be made without deviating from the scope and spirit of the invention. Thus, this invention is described by way of illustration rather than limitation and accordingly it is understood that this invention is to be limited only by the appended claims taken in view of the prior art.

What is claimed as new is:

1. A control system for a machine having a tool which is movable relative to a workpiece, thereby interacting with said workpiece to perform an operation thereon at a tool-workpiece interface, the interaction of said tool with said workpiece generating a measurable physical manifestation, said control system comprising:

a manual control system including manually adjustable signal controls operative to generate and to supply manually regulated drive signals to said machine to displace said tool relative to said workpiece under control of the manually regulated drive signals;

an adaptive control system including an adaptive controller operative to generate and to supply automatically regulated drive signals to said machine to displace said tool relative to said workpiece under control of the automatically regulated drive signals, comprising:

a source of predetermined constant signals related to a desired mode of operation of said machine;

means for measuring the physical manifestation and for generating a manifestation signal having a value which is a function of the manifestation;

means for receiving the constant signals and the manifestation signal for generating the automatically regulated command signals as a function of the received signals in accordance with a predetermined strategy adapted to maximize machine productivity, and for supplying the automatically regulated command signals to said machine to displace said tool relative to said workpiece under control of the automatically regulated command signals; and means for alternatively switching the source of the drive signals for the machine between the manual control system and the adaptive control system.

2. The control system as defined in claim 1, wherein said machine has a rotatable spindle holding said tool, a table mounting said workpiece and the predetermined constant signals related to a desired mode of operation of said machine include at least one of the constant signals of maximum spindle torque, minimum spindle torque, maximum tool temperature, maximum table vibration, maximum spindle speed, maximum table traverse per revolution of said spindle, maximum table traverse per unit of time, and maximum tool force.

3. The control system as defined in claim 1, wherein said machine has a spindle holding said tool, a table mounting said workpiece and the predetermined constant signals related to a desired mode of operation of said machine include maximum spindle torque, minimum spindle torque, maximum tool temperature, maximum table vibration, maximum spindle speed, maximum rate of movement of said workpiece and said tool relative to one another, maximum table traverse per unit of time, and maximum tool force.

4. The control system as defined in claim 1, wherein said machine has a stationary frame and a rotatable spindle, the measurable physical manifestation generated due to the interaction of said tool with said workpiece is heat which produces a thermal voltage as a function of the heat, and said means for measuring the physical manifestation and for generating the manifestation signal having a value which is a function of the manifestation, includes a tool temperature sensing device, comprising: a toroidal resilient means disposed intermediate said rotatable spindle and said stationary frame, and means operative to receive the thermal voltage from said stationary frame through said toroidal means, said rotatable spindle and said tool.

5. The control system as defined in claim 1, wherein said machine has a rotatable spindle and a stationary frame, the interaction of said tool with said workpiece generates the measurable physical manifestation of spindle torsional angular displacement, and said means for measuring the physical manifestation and for generating the manifestation signal having a value which is a function of the manifestation, includes a spindle torque sensing device, comprising: means fixed to said rotatable spindle operative to generate output signals during the machining operation as a function of the spindle torsional angular displacement, a rotary transformer having first windings fixed to said stationary frame and second windings fixed to said rotatable spindle, said first windings operative to receive the output signals and to inductively transfer the output signals to said second winding and means operative to receive from said second windings of said rotary transformer, the output signals generated as a function of the spindle torsional angular displacement.

6. The control system as defined in claim 1, wherein the predetermined constant signals related to a desired mode of operation have values setting desired ranges of machine to maximize the machine productivity strategy adapted to maximize the machine productivity comprises a plan to displace said tool relative to said workpiece in such a manner as to generate a value for the manifestation signal which is without the constant signal values setting the desired ranges of machine operation, then to displace said tool relative to said workpiece in such a manner as to generate a value for the generated manifestation signal which is within the constant signal value setting the desired ranges of machine operation and to continually alternatively cause generation of values of the manifestation signal without and then within the constant signal values.

7. The control system as defined in claim 1, wherein the predetermined constant signals related to a desired mode of operation have values setting desired ranges of machine operation, and the predetermined strategy applied to said means for receiving the constant signals and the manifestation signal is adapted to maximize the machine productivity by sequentially increasing the motion of said tool and said workpiece relative to each other until such time as a value of the manifestation signal generated is outside the constant signal values setting the desired range of machine operation, followed by decreasing the motion of said tool and said workpiece relative to each other to cause generation of a value for the manifestation signal within the values setting the desired range of machine operation and then by alternatively generating on a continuing basis signals which decrease and then increase the motion of said tool and said workpiece relative to each other.

8. The combination of a manual control system and an adaptive control system for a machine having a tool which is movable relative to a workpiece, thereby interacting with said workpiece to perform an operation thereon at a tool-workpiece interface, the interaction of said tool with said workpiece generating a measurable physical manifestation, comprising:

a drive system for said machine operative to displace said tool relative to said workpiece under control of command signals;

a manual controller included in the manual control system, operative to generate and to supply manually regulated control signals, first drive signals and to supply the first drive signals to said machine to displace said tool relative to said workpiece under control of the first drive signals;

an adaptive controller included in the adaptive control system operative to generate and to supply automatically regulated drive signals to said drive system to cause said drive system to generate, as a function of the automatically regulated control signals, second command signals and to supply the second command signals to said machine to displace said tool relative to said workpiece under control of the second command signals, comprising:

a source of predetermined constant signals related to a desired mode of operation of said machine;

means for measuring the physical manifestation and for generating a manifestation signal having a value which is a function of the manifestation;

means for receiving the constant signals and the manifestation signal, generating the automatically regulated control signals as a function of the received signals in accordance with a predetermined plan adapted to maximize machine productivity and supplying the automatically regulated drive signals to said drive system to cause said drive system to generate, as a function of the automatically regulated control signals, second command signals and to supply the second command signals to said machine to displace said tool relative to said workpiece under control of the second command signals; and means to alternately switch said drive system between said manual controller and said adaptive controller.

9. In a control system for a machine having a tool which is movable relative to a workpiece, thereby interacting with said workpiece to perform an operation thereon at a tool-workpiece interface, the interaction of said tool with said workpiece generating a measurable physical manifestation, means for measuring the physical manifestation and for generating a manifestation signal having a value which is a function of the manifestation, said control system having a device system operative to move said tool and said workpiece relative to each other under control of drive signals, a source of predetermined constant signals having values setting desired ranges of machine operation, an improvement comprising:

means for receiving the constant signals and the manifestation signal and for generating drive signals as a function of the received signals in accordance with a predetermined plan adapted to maximize machine productivity by causing said drive system to displace said tool and said workpiece relative to each other in such a manner as to generate a value for the manifestation signal which is without the constant signal values setting the desired ranges of machine operation and by alternatively causing said drive system to displace said tool relative to said workpiece in such a manner as to generate a value for the generated manifestation signal which is within the constant signal values setting the desired ranges of machine operation and to thereby maximize the machine productivity.

10. In a control system for a machine having a tool adapted to be displaced relative to a workpiece, thereby interacting with said workpiece to perform an operation thereon at a tool-workpiece interface, the interaction of said tool with said workpiece generating a measurable physical manifestation, means operative to measure the physical manifestation and to continually generate manifestation signals having values which are a function of the manifestation, a drive system operative to rotate said tool and translate said tool and said workpiece relative to each other under control of command signals, a source of predetermined constant signals having values setting desired ranges of machine operation, a controller operative to receive the constant signals and each manifestation signal generated, to generate powering signals as a function of the received signals for said drive system to rotate and translate said tool and said workpiece relative to each other, an improvement which comprises:

means within said controller operative to generate the powering signals as a function of the received signals in accordance with a predetermined plan to increase productivity of said machine by increasing the rate of rotation and translation of said tool and said workpiece relative to each other until a value of the manifestation signal generated is outside the constant signal values setting the desired ranges of machine operation and to immediately afterwards decrease the rate of rotation and translation of said tool and said workpiece relative to each other to thereby cause generation of a value for the manifestation signal within the values setting the desired ranges of machine operation, and to thereafter cause generation of values for the manifestation signals which are alternately outside and then inside the constant signal values setting the desired ranges of machine operation.

\* \* \* \* \*